United States Patent

Yamamoto et al.

[11] 3,922,264
[45] *Nov. 25, 1975

[54] PRODUCTION OF BENZODIAZEPINE DERIVATIVES

[75] Inventors: Hisao Yamamoto, Nishinomiya; Shigeho Inaba, Takarazuka; Tadashi Okamoto, Ashiya; Toshiyuki Hirohashi, Kobe; Kikuo Ishizumi, Minoo; Michihiro Yamamoto, Takarazuka; Isamu Maruyama, Minoo; Kazuo Mori, Kobe; Tsuyoshi Kobayashi, Minoo, all of Japan

[73] Assignee: Sumitomo Chemical Company, Limited, Osaka, Japan

[ * ] Notice: The portion of the term of this patent subsequent to Jan. 12, 1988, has been disclaimed.

[22] Filed: Aug. 30, 1973

[21] Appl. No.: 393,193

Related U.S. Application Data

[63] Continuation of Ser. No. 74,464, Sept. 22, 1970, abandoned, which is a continuation-in-part of Ser. No. 780,211, Nov. 29, 1968, abandoned.

[30] Foreign Application Priority Data

Dec. 7, 1967 Japan.............................. 42-78812
Dec. 14, 1967 Japan.............................. 42-80324

[52] U.S. Cl....... 260/239.3 D; 260/326.15; 424/244
[51] Int. Cl.²......................................... C07D 243/36
[58] Field of Search............................. 260/239.3 D

[56] References Cited
UNITED STATES PATENTS

| | | | |
|---|---|---|---|
| 3,555,013 | 1/1971 | Yamamoto et al. | 260/239.3 D |
| 3,558,603 | 1/1971 | Yamamoto et al. | 260/239.3 D |
| 3,631,029 | 12/1971 | Yamamoto et al. | 260/239.3 D |
| 3,632,374 | 1/1972 | Yamamoto et al. | 260/239.3 D |
| 3,632,573 | 1/1972 | Yamamoto et al. | 260/239.3 D |
| 3,632,805 | 1/1972 | Yamamoto et al. | 260/239.3 D |
| 3,634,402 | 1/1972 | Yamamoto et al. | 260/239.3 D |
| 3,652,551 | 3/1972 | Yamamoto et al. | 260/239.3 D |
| 3,658,809 | 4/1972 | Yamamoto et al. | 260/239.3 D |

*Primary Examiner*—Henry R. Jiles
*Assistant Examiner*—Robert T. Bond
*Attorney, Agent, or Firm*—Stevens, Davis, Miller & Mosher

[57] ABSTRACT

Benzodiazepine derivatives of the formula,

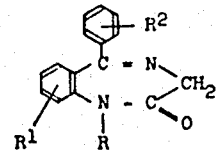

wherein R is hydroxyalkyl, halogenoalkyl or alkoxyalkyl; $R^1$ is hydrogen, halogen or nitro; and $R^2$ is hydrogen, halogen, alkyl, halogenoalkyl, alkoxy or nitro; which have excellent tranquilizing effect, etc., are produced by reacting a novel 1-substituted 2-aminomethylindole derivative of the formula,

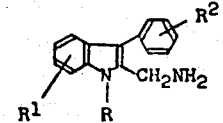

wherein R, $R^1$ and $R^2$ have the same meanings as defined above, with an appropriate oxidizing agent.

4 Claims, No Drawings

PRODUCTION OF BENZODIAZEPINE DERIVATIVES

The present application is a continuation of U.S. application Ser. No. 74,464, filed Sept. 22, 1970, now abandoned, which is a continuation-in-part of application U.S. Ser. No. 780,211 filed on Nov. 29, 1968, now abandoned.

The present invention relates to a process for preparing benzodiazepine derivatives which are useful as medicines. More particularly, the invention pertains to a novel process for producing benzodiazepine derivatives represented by the formula,

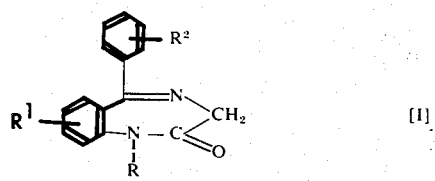

wherein R is monohydroxy-$C_1$-$C_4$-alkyl, monohalogeno-$C_1$-$C_4$-alkyl, dihalogeno-$C_1$-$C_4$-alkyl, trihalogeno-$C_1$-$C_4$-alkyl or $C_1$-$C_3$-alkoxy-substituted-$C_1$-$C_4$-alkyl; $R^1$ is hydrogen, halogen or nitro; and $R^2$ is hydrogen, halogen, $C_1$-$C_3$-alkyl, halogeno-$C_1$-$C_3$-alkyl, $C_1$-$C_3$-alkoxy or nitro or salts thereof.

That is, the invention relates to a process, according to which benzodiazepine derivatives [I] or salts thereof are readily obtained by reacting a 1-substituted 2-aminomethylindole derivative represented by the formula,

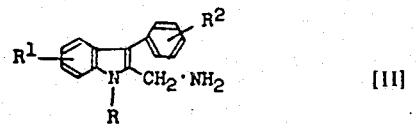

wherein R, $R^1$ and $R^2$ respectively have the same meanings as defined above, or its salt with an appropriate oxidizing agent.

Further the present invention relates to novel benzodiazepine derivatives, which are useful as medicines, represented by the formula,

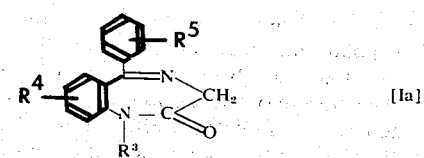

wherein $R^3$ is $C_1$-$C_3$-alkoxy-$C_1$-$C_4$-alkyl; $R^4$ is halogen and $R^5$ is halogen or $C_1$-$C_3$-alkyl, and pharmaceutically acceptable acid-addition salts thereof and to pharmaceutical use thereof.

The benzodiazepine derivatives [I] include several known compounds which are used as remarkably effective tranquilizers, musclerelaxants, anticonvulsants and hyponotics.

A few processes for producing the benzodiazepine derivatives have been described. In an instance, which is one of the most useful procedures by now, a 1-unsubstituted benzodiazepine derivative is given by contacting a 2-aminobenzophenone derivative with glycine hydrochloride or glycine ethyl ester, and the 1-unsubstituted benzodiazepine derivative is alkylated with an alkyl halide in the presence of sodium hydride in dimethylformamide to give the corresponding 1-substituted benzodiazepine derivative [Sternbach et al.: Journal of Medicinal Chemistry 815 (1962) and Belgian Pat. No. 692,621].

Contrary to these procedures, we have found, unexpectedly, that benzodiazepine derivatives [I] can be prepared smoothly and economically in high yield and of high purity by reacting a novel 1-substituted 2-aminomethyl-indole derivative [II] or its acid-addition salt with an appropriate oxidizing agent. Such a process for converting a 5-membered ring compound into a 7-membered ring compound by ring expansion reaction has not heretofore been described or suggested in the literature. This new and useful process thus differs markedly from the known method and represents an improvement thereover.

One object of the present invention is to provide a novel process for producing benzodiazepine derivatives [I] and their acid-addition salts.

Another object is to provide novel benzodiazepine derivatives and their acid-addition salts which are useful as medicines.

Other objects of the present invention will be apparent from the following description.

In order to accomplish these objects, the present invention provides a process for preparing benzodiazepine derivatives [I] or their acid-addition salts, which comprises reacting a 2-aminomethyl-indole derivative [II] or its acid-addition salt with at least stoichiometric amount of an oxidizing agent selected from the group consisting of ozone, hydrogen peroxide, performic acid, peracetic acid, perbenzoic acid, chromic acid and potassium permanganate in the presence of an inert solvent.

Further the present invention provides novel benzodiazepine derivatives [Ia] and their acid-addition salts.

Furthermore, the present invention provides a pharmaceutical composition consisting of a therapeutically effective amount of a benzodiazepine derivative [Ia] or its pharmaceutically acceptable acid-addition salt and a pharmaceutically acceptable carrier or diluent.

The 1-substituted 2-aminomethylindole derivatives [II] used in the process of the present invention are prepared easily, for example, by the reduction of 1-substituted indole-2-carboxamide derivatives, which are prepared from the corresponding indole-2-carboxamide with an alkylating agent.

These indole-2-carboxamide derivatives are prepared by the amidation of indole-2-carboxylic acid derivatives in good yield. Further, the indole-2-carboxylic acid derivatives are obtained, for example, by the cyclization of benzene diazonium compounds with ester derivatives of α-benzyl-β-keto acid.

These procedures are very useful in practice as all of these processes proceed smoothly and give the objective products in high yield.

The method for producing the 1-substituted-2-aminomethylindole derivatives [II] may be represented, in general, by the following reaction schema:

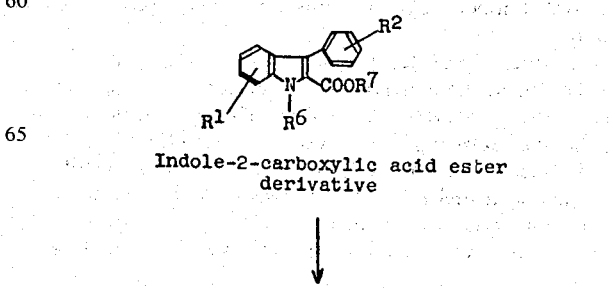

Indole-2-carboxylic acid ester derivative

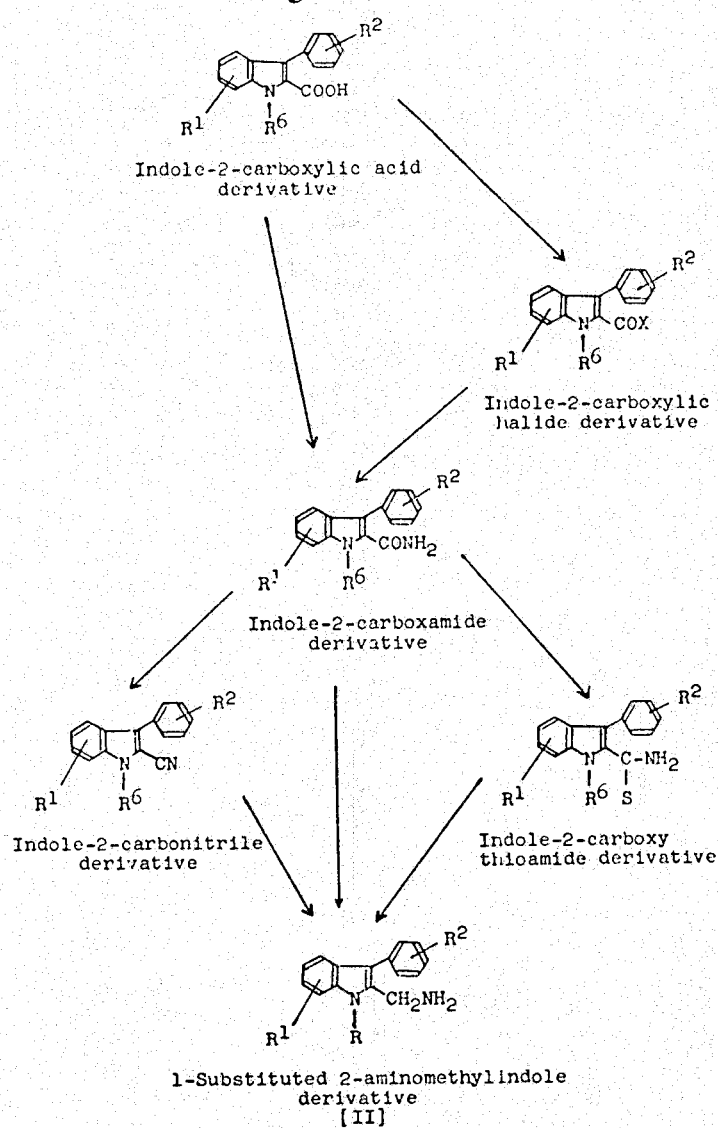

1-Substituted 2-aminomethylindole derivative [II]

wherein R, R¹ and R² have the same meanings as defined wherein R, R¹ and R² have the same meanings as defined above; R⁶ is hydrogen or has the same meaning as defined in the case of R; R⁷ is alkyl; and X is halogen.

The process of the present invention is illustrated more particularly as follows:

In the process of the present invention, a 1-substituted 2-aminomethylindole derivative [II] or its salt is reacted with an appropriate oxidizing agent, for example, ozone, hydrogen peroxide, a peracid (e.g. performic acid, peracetic acid and perbenzoic acid), chromic acid or potassium permanganate. The reaction is generally readily effected at room temperature. Higher or lower temperatures are sometimes found more satisfactory.

Chromic anhydride or ozone is preferred as the oxidizing agent. The reaction may preferably be carried out in the presence of a solvent. The solvent depends upon the oxidizing agents used, and is selected from water, acetone, carbon tetrachloride, acetic acid, sulfuric acid and the like. The oxidizing agent is used in a stoichiometric amount or more.

A 1-substituted 2-aminomethylindole derivative or its salt, such as hydrochloride, hydrobromide, sulfate, phosphate, nitrate, acetate and the like is dissolved or suspended in a solvent and an oxidizing agent is added to the solution or suspension with stirring. The reaction is generally completed within about 24 hours.

The desired benzodiazepine derivative can be separated from the reaction mixture in a crude form by extraction after neutralization or without neutralization and by evaporation to dryness. The product may be further purified, if desired, by recrystallization from an appropriate solvent such as ethanol, isopropanol and the like.

Thus, the benzodiazepine derivatives obtained by the process of the present invention are examplified as follows:

7-Chloro-5-phenyl-1-(trifluoromethyl)-1,3-dihydro-2H-1,4-benzodiazepin-2-one;
5-Phenyl-1-(trifluoromethyl)-1,3-dihydro-2H-1,4-benzodiazepin-2-one;
7-Chloro-5-phenyl-1-(2',2',2'-trifluoroethyl)-1,3-dihydro-2H-1,4-benzodiazepin-2-one;

5-Phenyl-1-(2',2',2'-trifluoroethyl)-1,3-dihydro-2H-1,4-benzodiazepin-2-one;

7-Nitro-5-phenyl-1-(2',2',2'-trifluoroethyl)-1,3-dihydro-2H-1,4-benzodiazepin-2-one;

7-Chloro-5-(o-chlorophenyl)-1-(2',2',2'-trifluoroethyl)-1,3-dihydro-2H-1,4-benzodiazepin-2-one;

7-Chloro-5-(o-fluorophenyl)-1-(2',2',2'-trifluoroethyl)-1,3-dihydro-2H-1,4-benzodiazepin-2-one;

7-Chloro-5-(p-nitrophenyl)-1-(2',2',2'-trifluoroethyl)-1,3-dihydro-2H-1,4-benzodiazepin-2-one;

7-Chloro-5-(o-tolyl)-1-(2',2',2'-trifluoroethyl)-1,3-dihydro-2H-1,4-benzodiazepin-2-one;

7-Nitro-5-(o-nitrophenyl)-1-(2',2',2'-trifluoroethyl)-1,3-dihydro-2H-1,4-benzodiazepin-2-one;

7-Chloro-5-(o-trifluoromethylphenyl)-1-(2',2',2'-trifluoroethyl)-1,3-dihydro-2H-1,4-benzodiazepin-2-one;

7-Chloro-5-(p-methoxyphenyl)-1-(2',2',2'-trifluoroethyl)-1,3-dihydro-2H-1,4-benzodiazepin-2-one;

7-Chloro-5-phenyl-1-(2'-chloroethyl)-1,3-dihydro-2H-1,4-benzodiazepin-2-one;

7-Chloro-5-phenyl-1-(3'-chloropropyl)-1,3-dihydro-2H-1,4-benzodiazepin-2-one;

7-Chloro-5-phenyl-1-(methoxyethyl)-1,3-dihydro-2H-1,4-benzodiazepin-2-one;

7-Chloro-5-phenyl-1-(ethoxyethyl)-1,3-dihydro-2H-1,4-benzodiazepin-2-one;

5-Phenyl-1-(methoxymethyl)-1,3-dihydro-2H-1,4-benzodiazepin-2-one;

5-Phenyl-1-(ethoxymethyl)-1,3-dihydro-2H-1,4-benzodiazepin-2-one;

7-Chloro-5-phenyl-1-(methoxypropyl)-1,3-dihydro-2H-1,4-benzodiazepin-2-one; and

5-Phenyl-1-(methoxypropyl)-1,3-dihydro-2H-1,4-benzodiazepin-2-one.

The acid-addition salt of the benzodiazepine derivative [I] may be prepared by reacting the benzodiazepine derivative [I] with an acid such as hydrochloric acid, hydrobromic acid, sulfuric acid, phosphoric acid, nitric acid or acetic acid in a suitable solvent. The salts may be also obtained from the reaction mixture.

Among the benzodiazepine derivatives [I] or their acid-addition salts produced by the process of the present invention, the compounds represented by the aforesaid formula [Ia] or their acid-addition salts are novel compounds, and they have been found to possess central nervous system activities, specially as tranquillizing, sedative, muscle reluxing, spasmolytic and hexobarbital potentiating activities. Illustratively, 1-($\beta$-ethoxyethyl)-5-(o-fluorophenyl)-1,3-dihydro-2H-1,4-benzodiazepin-2-one shows anticonvulsing, muscle relaxant and hexobarbital potentiation activities. The results of pharmacological tests in mice are given in the following Table. These pharmacological activities of the present compound are found to be more potent than that of the chemical related compounds, Chlorodiazepoxide (2-methylamino-5-phenyl-7-chloro-3H-1,4-benzodiazepine-4-oxide) and Diazepam (1-methyl-5-phenyl-7-chloro-1,3-dihydro-2H-1,4-benzodiazepin-2-one). The antipentylenetetrazole activity of the said compound is 80 times higher than that of Chlorodiazepoxide and 4 times or more higher than that of Diazepam.

Table

| Test | Pharmacological activities in mice (mg/kg) (p.o.) | | |
|---|---|---|---|
| | 1-($\beta$-Ethoxyethyl)-5-(o-fluorophenyl)-1,3-dihydro-2H-1,4-benzodiazepin-2-one | Diazepam | Chlorodiazepoxide |
| Antipentylenetetrazol (ED 50) | 0.1 | 0.43 | 8.0 |
| Muscle relaxant (ED 50) | 5.0 | 9.1 | 95 |
| Hexobarbital potentiation (0.5 mg/kg (ip)) | +++ | ++ | + |

+++ remarked potentiation
++ moderate potentiation
+ slight potentiation

Benzodiazepines or salts thereof of the present invention can be administered parenterally or orally in therapeutic dosage forms with dosage adjusted to individual needs, that is, in solid or liquid dosage forms such as tablets, dragees, capsules, suspensions, solutions, elixirs and the like.

The present invention is illustrated more particularly by the following examples. However, it should be understood that the present invention is not limited to them.

EXAMPLE 1

A solution of 3 g of chromic anhydride in 3 ml of water is added dropwise to a mixture of 3.6 g of 2-aminomethyl-5-chloro-1-($\beta$-ethoxyethyl)-3-phenylindole hydrochloride in 40 ml of glacial acetic acid under cooling with stirring. The resulting mixture is stirred at room temperature overnight. The reaction mixture is diluted with water, basified with an aqueous ammonia solution and extracted with benzene. The benzene extracts are combined and dried over anhydrous sodium sulfate, and the solvent is removed by distillation under reduced pressure. The residue is chromatographed on silica gel and recrystallized from benzene-n-hexane to give 7-chloro-1-($\beta$-ethoxyethyl)-5-phenyl-1,3-dihydro-2H-1,4-benzodiazepin-2-one, m.p. 156°–158°C.

EXAMPLE 2

Into a solution of 1 g of 2-aminoethyl-5-chloro-1-(ethoxyethyl)-3-(o-fluorophenyl)-indole in 20 ml of acetic acid is bubbled ozone at 10°–20°C with stirring for 2 hours. After the reaction is completed, the reaction mixture is diluted with water, basified with ammonium hydroxide and extracted with ether. The ethereal layer is dried over anhydrous sodium sulfate and the solvent is removed under reduced pressure. The residue is purified by chromatography and crystallized from isopropyl alcohol to give 7-chloro-1-($\beta$-ethoxyethyl)-5-(o-fluorophenyl)-1,3-dihydro-2H-1,4-benzodiazepin-2-one as colorless prisms, m.p. 98°–100°C.

The hydrochloride is prepared by conventional techniques and is found to have a melting point of 201°–203°C (decomp.) after recrystallization from isopropyl alcohol-ether.

EXAMPLE 3

A solution of 1 g of chromic anhydride in 2 ml of water is added dropwise to a solution of 1 g of 2-aminomethyl-5-chloro-1-($\beta$-ethoxyethyl)-3-(o-fluorophenyl)-indole in 20 ml of acetic acid under cooling with stirring. The mixture is stirred at room temperature overnight. The reaction mixture is poured into water, basified with an aqueous ammonia solution and extracted with methylene chloride. The methylene chloride extracts are combined and dried over anhydrous sodium sulfate, and the solvent is removed under reduced pressure. The oily residue is chromatographed on alumina and crystallized from isopropyl alcohol to give 7-chloro-1-(β-ethoxyethyl)-5-(o-fluorophenyl)-1,3-dihydro-2H-1,4-benzodiazepin-2-one, m.p. 98°–100°C.

EXAMPLE 4

In a manner similar to that described in EXAMPLES 1 through 3, the following compounds are prepared.

7-Chloro-1-(β-ethoxyethyl)-5-(chlorophenyl)-1,3-dihydro-2H-1,4-benzodiazepin-2-one, m.p. 142°–143°C.

7-Chloro-1-(β-ethoxyethyl)-5-(o-tolyl)-1,3-dihydro-2H-1,4-benzodiazepin-2-one, m.p. 141°–142°C.

7-Chloro-1-(β-methoxyethyl)-5-(o-fluorophenyl)-1,3-dihydro-2H-1,4-benzodiazepin-2-one, m.p. 93°–95°C.

7-Chloro-1-(β-methoxyethyl)-5-phenyl-1,3-dihydro-2H-1,4-benzodiazepin-2-one, m.p. 108°–109°C.

7-Chloro-1-(methoxymethyl)-5-(o-fluorophenyl)-7-chloro-1,3-dihydro-2H-1,4-benzodiazepin-2one, m.p. 116°–117°C.

7-Chloro-1-(β-n-propoxyethyl)-5-phenyl-7-chloro-1,3-dihydro-2H-1,4-benzodiazepin-2-one, m.p. 99°–100°C.

7-Chloro-1-(β-n-propoxyethyl)-5-(o-fluorphenyl)-7-chloro-1,3-dihydro-2H-1,4-benzodiazepin-2-one, m.p. 85°–87°C.

EXAMPLE 5

A solution of 3 g of chromic anhydride in 3 ml of water is added dropwise to a mixture of 3.7 g of 2-aminomethyl-5-chloro-3-phenyl-(2',2',2'-trifluoroethyl)-indole hydrochloride in 40 ml of glacial acetic acid under cooling with stirring. The resulting mixture is stirred at room temperature overnight. The reaction mixture is diluted with water, basified with an aqueous ammonia solution and extracted with ether. The ethereal extracts are combined, washed with water and dried, and the solvent is removed under reduced pressure. The residue is crystallized from an isopropyl alcohol-isopropylether solvent to give 7-chloro-5-phenyl-1-(2',2',2'-trifluoroethyl)-1,3-dihydro-2H-1,4-benzodiazepin-2-one, m.p. 163°–164°C.

Using above procedure but replacing 2-aminomethyl-5-chloro-3-phenyl-(2',2',2'-trifluoroethyl)-indole hydrochloride by 2- aminomethyl-5-(o-fluorophenyl)-1-(2',2',2'-trifluoroethyl)-1,3-dihydro-2H-1,4-benzodiazepin-2-one hydrochloride, m.p. 195°–197°C. (decomposition)

EXAMPLE 6

Into a mixture of 4 g of 2-aminomethyl-5-chloro-1-(3'-chloropropyl)-3-phenyl-indole hydrochloride and 50 ml of acetic acid is bubbled ozone at 15°–20°C with stirring for 1 hour. After the reaction is completed, the reaction mixture is neutralized with aqueous sodium carbonate and extracted with chloroform. The chloroform layer is washed with water and dried over anhydrous sodium sulfate. The solvent is removed by distillation under reduced pressure. The residue is recrystallized from ether-hexane to give 7-chloro-1-(3'-chloropropyl)-5-phenyl-1,3-dihydro-2H-1,4-benzodiazepin-2-one, m.p. 86°–89°C.

EXAMPLE 7

Ozone is passed through a stirred solution of 1.2 g of 1-(β-hydroxyethyl)-2-aminomethyl-3-(o-fluorophenyl)-5-chloroindole hydrochloride in 40 ml of acetic acid at 15°–19°C for 40 minutes. The reaction mixture is poured into ice-water, and basified with an aqueous ammonia and extracted with chloroform. The chloroform layer is dried over anhydrous sodium sulfate, and distilled under reduced pressure to obtain an oily residue, which is dissolved in ether and treated with ethereal hydrogen chloride to give 1-(β-hydroxyethyl)-5-(o-fluorophenyl)-7-chloro-1,3-dihydro-2H-1,4-benzodiazepin-2-one hydrochloride. Recrystallization from a mixture of methanol and ether gives pale yellow prisms, m.p. 194°–196°C (decomp.).

The hydrochloride is dissolved in water, and basified with an aqueous ammonia and then extracted with chloroform. The chloroform layer is dried over anhydrous sodium sulfate, and chloroform is removed by distillation to give the free base as an oily substance which is crystallized from ethanol. Recrystallization from a mixture of ethanol and isopropyl ether gives colorless prisms, m.p. 114°–116°C.

Elementary analysis for $C_{17}H_{14}O_2N_2FCl$

Calculated (%): C, 61.36; H, 4.24; N, 8.42; Cl, 10.66.

Found (%): C, 61.48; H, 4.23; N, 8.34; Cl, 10.71.

EXAMPLE 8

Using the procedure similar to that in EXAMPLE 6, but replacing 1-(β-hydroxyethyl)-2-aminomethyl-3-(o-fluorophenyl(-5-chloroindole by 1-(β-hydroxyethyl)-2-aminomethyl-3-phenyl-5-nitroindole, there is obtained 1-(β-hydroxyethyl)-5-phenyl-7-nitro-1,3-dihydro-2H-1,4-benzodiazepin-2-one. Recrystallization from a mixture of ethanol-chloroform to give colorless plates of m.p. 235°–236°C.

Elementary analysis for $C_{17}H_{15}O_4N_3$

Calculated (%): C, 62.76; H, 4.65; N, 12.92.

Found (%): C, 62.44; H, 5.01; N, 12.62.

EXAMPLE 9

According to a method similar to that of EXAMPLE 6 except that 1-(β-hydroxyethyl)-2-aminomethyl-3-phenyl-5-chloroindole hydrochloride is used in place of 1-(β-hydroxyethyl)-2-aminomethyl-3-(o-fluorophenyl)-5 -chloroindole hydrochloride, 1-(β-hydroxyethyl)-5-phenyl-7-chloro-1,3-dihydro-2H-1,4-benzodiazepin-2-one is obtained. Recrystallization from ethanol gives colorless prisms melting at 158°–160°C.

Similarly, the following compounds are prepared;

1-(β-Hydroxyethyl)-5-(o-chlorophenyl)-7-chloro-1,3-dihydro-2H-1,4-benzodiazepin-2-one 1-(β-Hydroxyethyl)-5-(o-tolyl)-7-chloro-1,3-dihydro-2H-1,4-benzodiazepin-2-one 1-(γ-Hydroxypropyl)-5-phenyl-7-chloro-1,3-dihydro-2H-1,4-benzodiazepin-2-one, m.p. 157°–159°C 1-(γ-Hydroxypropyl)-5-(o-fluorophenyl)-7-chloro-1,3-dihydro-2H-1,4-benzodiazepin-2-one 1-(γ-Hydroxypropyl)-5-(o-chlorophenyl)-7-chloro-1,3-dihydro-2H-1,4-benzodiazepin-2-one 1-(γ-Hydroxypropyl)-5-(o-tolyl)-7-chloro-1,3-dihydro-2H-1,4-benzodiazepin-2-one 1-(γ-Hydroxypropyl)-5-phenyl-7-nitro-1,3-dihydro-2H-1,4-benzodiazepin-2-one.

What we claim is:

1. A process for producing a compound represented by the formula,

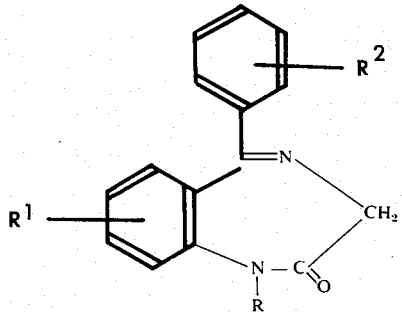

wherein R is monohalogeno-$C_1$-$C_4$-alkyl, dihalogeno-$C_1$-$C_4$-alkyl, trihalogeno-$C_1$-$C_4$-alkyl or $C_1$-$C_3$-alkoxy-substituted $C_1$-$C_4$-alkyl; $R^1$ is hydrogen, halogen or nitro; and $R^2$ is hydrogen, halogen, $C_1$-$C_3$-alkyl, halogeno-$C_1$-$C_3$-alkyl, $C_1$-$C_3$-alkoxy or nitro, or their acid-addition salts, which comprises reacting a 1-substituted 2-aminomethylindole compound represented by the formula,

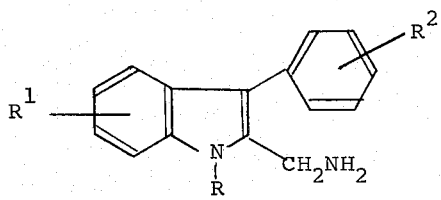

wherein R, $R^1$ and $R^2$ have the same meanings as defined above, or an acid-addition salt thereof with at least the stoichiometric amount of an oxidizing agent selected from the group consisting of ozone, hydrogen peroxide, performic acid, peracetic acid, perbenzoic acid, chromic acid and potassium permanganate in the presence of a solvent selected from the group consisting of water, acetone, carbon tetrachloride, acetic acid and sulfuric acid.

2. A process according to claim 1, wherein the oxidizing agent is chromic anhydride or ozone and the reaction is carried out at a room temperature.

3. A process according to claim 1, wherein acid of the acid-addition salt of the benzodiazepine derivative and the 1-substituted 2-aminomethylindole derivative is hydrochloric acid, hydrobromic acid, sulfuric acid, phosphoric acid, nitric acid or acetic acid.

4. A process according to claim 1, wherein R is β-hydroxyethyl.

* * * * *